US010205777B2

(12) United States Patent
Norlin et al.

(10) Patent No.: US 10,205,777 B2
(45) Date of Patent: Feb. 12, 2019

(54) TRAFFIC COORDINATION FOR COMMUNICATION SESSIONS INVOLVING WIRELESS TERMINALS AND SERVER DEVICES

(71) Applicant: Telefonaktiebolaget LM Ericsson (publ), Stockholm (SE)

(72) Inventors: Cristian Norlin, Stockholm (SE); Joakim Formo, Åkersberga (SE); Marcus Gårdman, Skärholmen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 308 days.

(21) Appl. No.: 14/912,353

(22) PCT Filed: Dec. 13, 2013

(86) PCT No.: PCT/SE2013/051509
§ 371 (c)(1),
(2) Date: Feb. 16, 2016

(87) PCT Pub. No.: WO2015/088412
PCT Pub. Date: Jun. 18, 2015

(65) Prior Publication Data
US 2016/0205184 A1 Jul. 14, 2016

(51) Int. Cl.
*G06F 15/16* (2006.01)
*H04L 29/08* (2006.01)
(Continued)

(52) U.S. Cl.
CPC ...... *H04L 67/1095* (2013.01); *H04L 67/2833* (2013.01); *H04W 4/18* (2013.01);
(Continued)

(58) Field of Classification Search
CPC .......... H04L 67/1095; H04L 67/2833; H04W 56/00; H04W 56/001; H04W 4/00; H04W 4/006; H04W 4/18; H04W 76/00
(Continued)

(56) References Cited

U.S. PATENT DOCUMENTS

| 2010/0099396 | A1* | 4/2010 | Huq | H04L 67/125 |
| | | | | 455/420 |
| 2012/0044887 | A1* | 2/2012 | Zdarsky | H04L 67/02 |
| | | | | 370/329 |

(Continued)

FOREIGN PATENT DOCUMENTS

| EP | 2403276 A1 | 1/2012 |
| RU | 2432608 C2 | 10/2011 |

*Primary Examiner* — Frantz B Jean
(74) *Attorney, Agent, or Firm* — Murphy, Bilak & Homiller, PLLC

(57) ABSTRACT

The invention concerns a communication synchronization device (16), method, computer program and computer program product for synchronizing communication (RQ, PRES) as well as to a method, wireless device (58), computer program and computer program product for handling such communication. The device (16) investigates (36) the communication patterns of communications between the wireless terminal (24) and server devices (18, 20, 22) communication sessions (CS1, CS2, CS3) between applications (A1, A2, A3) running in the wireless terminal and the server devices (18, 20, 22), determines a downlink coordination group, collects (38) server device transmissions (PRES) of the group made by the server devices through aligning them with each other in time and sends (40) the collected transmissions to the wireless terminal as an aggregated transmission via a common wireless link. The wireless device (58) receives (52) the aggregated transmission and distributes (54) data therein to the applications (A1, A2, A3).

25 Claims, 7 Drawing Sheets

(51) Int. Cl.
    *H04W 56/00*     (2009.01)
    *H04W 4/18*      (2009.01)
    *H04W 76/00*     (2018.01)
    *H04W 4/38*      (2018.01)
(52) U.S. Cl.
    CPC ........... *H04W 4/38* (2018.02); *H04W 56/001* (2013.01); *H04W 76/00* (2013.01); *H04W 56/00* (2013.01)
(58) Field of Classification Search
    USPC .................................................. 709/248, 203
    See application file for complete search history.

(56) References Cited

U.S. PATENT DOCUMENTS

| | | | |
|---|---|---|---|
| 2013/0010693 A1* | 1/2013 | Luna | H04W 28/14 370/328 |
| 2013/0151469 A1 | 6/2013 | Baker et al. | |
| 2014/0155043 A1* | 6/2014 | Gell | H04L 67/02 455/414.1 |

\* cited by examiner

TRAFFIC COORDINATION FOR COMMUNICATION SESSIONS INVOLVING WIRELESS TERMINALS AND SERVER DEVICES

TECHNICAL FIELD

The invention relates to communication of wireless terminals in wireless communication networks. More particularly, the invention relates to a method, communication synchronization device, computer program and computer program product for synchronizing communication between client applications running in a wireless terminal (24) and corresponding server devices providing data for the applications as well as to a method, wireless device, computer program and computer program product for handling communication between client applications in a wireless terminal and corresponding server devices providing data for the applications.

BACKGROUND

Many wireless terminals connected to a wireless communication network such as smartphones or tablets are often capable of running multiple applications (such as apps) simultaneously. Today, a vast amount of these applications utilize some kind of data connection to functionalities or services residing on servers accessed via the Internet in order to occasionally or periodically be updated with information, and/or get access to additional functionality. Since most of these applications are triggered and run independently on the wireless terminal this often results in a situation in which a wireless terminal repeatedly connects to the wireless network in order to transmit and receive data over longer periods of time. This will often lead to the wireless terminal having one connection set up for each application.

This means that the wireless communication network is forced to deal with a lot of separate and impromptu session setups and shutdowns, as well as many parallel ad hoc data transmissions. Also, considering that the wireless network has many individual users with wireless terminals that run multiple applications, it is easy to see that there is quite a lot of unsynchronized data traffic that needs to be handled.

As there may be little or only small amounts of data transmitted, this means that the resources of the network are used excessively and not in proportion to the task. From a network point of view this is undesirable, because communication resources are being unnecessarily occupied by a wireless terminal. These resources may be better used, for instance by other wireless terminals, especially if the demand for resources is higher than the supply.

However, it may also be negative from the point of view of the wireless terminal. In the above-mentioned situation, the wireless terminal uses a lot of energy only to keep the separate connections in place, without any or only little data being exchanged with the wireless network. There is therefore an unnecessary energy usage that it may be of interest to reduce, especially since many wireless terminals are battery powered.

There is therefore a need for reducing the resources used by a wireless terminal in a wireless communication network communicating with server devices.

SUMMARY

One object of the invention is thus to reduce the resources used by a wireless terminal in a wireless communication network communicating with more than one server device.

This object is according to a first aspect of the invention achieved by a communication synchronization device for synchronizing communication between client applications running in a wireless terminal and corresponding server devices providing data for the applications. The communication synchronization device is provided in a wireless communication network and comprise:

a processor and memory, where the memory contains computer instructions executable by the processor though which the communication synchronization device is operative to investigate the communication patterns of communications between the wireless terminal and server devices, where these communications are performed in communication sessions between applications running in the wireless terminal and the server devices, determine a downlink coordination group comprising at least some of the communication sessions based on the investigation, collect transmissions made by the server devices in the communication sessions of the downlink coordination group through aligning the collected server device transmissions with each other in time, and send the collected server device transmissions to the wireless terminal as an aggregated transmission via a common wireless link for handling by the wireless terminal.

This object is according to a second aspect also achieved by a method for synchronizing communication between client applications running in a wireless terminal and corresponding server devices providing data for the applications. The method is performed in a communication synchronization device in a wireless communication network and comprises:

investigating the communication patterns of communications between the wireless terminal and server devices, where these communications are performed in communication sessions between applications running in the wireless terminal and the server devices, determining a downlink coordination group comprising at least some of the communication sessions based on the investigation, collecting transmissions made by the server devices in the communication sessions of the downlink coordination group through aligning the collected server device transmissions with each other in time, and sending the collected server device transmissions to the wireless terminal as an aggregated transmission via a common wireless link.

The object is according to a third aspect achieved through a computer program for synchronizing communication between client applications running in a wireless terminal and corresponding server devices providing data for the applications. The computer program comprises computer program code which when run in a communication synchronisation device, causes the communication synchronisation device to:

investigate the communication patterns of communications between the wireless terminal and server devices, where these communications are performed in communication sessions between applications running in the wireless terminal and the server devices, determine a downlink coordination group comprising at least some of the communication sessions based on the investigation, collect transmissions made by the server devices in the communication sessions of the downlink coordination group through aligning the collected server device transmissions with each other in time, and send the collected server device transmissions to the wireless terminal as an aggregated transmission via a common wireless link.

The object is according to a fourth aspect furthermore achieved by a computer program product for synchronizing communication between client applications running in at least one wireless terminal and corresponding server devices providing data for the applications. The computer program product is provided on a data carrier and comprises the computer program code according to the third aspect.

The invention according to the above-mentioned aspects has a number of advantages. It reduces the resources occupied by applications in a wireless terminal. Thereby the traffic load on the network is reduced. This also reduces energy consumption in the wireless terminal.

The aligning the collected server device transmissions with each other in time may comprise aligning the transmission times of the collected server device transmissions at the wireless interface.

The collecting may furthermore comprise buffering at least some server device transmissions until the aggregated transmission is due.

In an advantageous variation of the first aspect, the communication synchronization device is further operative to obtain traffic load data concerning the traffic load in the wireless communication network and base the determination of the downlink coordination group also on this traffic load data.

In a corresponding variation of the second aspect, the method further comprises obtaining traffic load data concerning the traffic load in the wireless communication network and the determining of the downlink coordination group is based also on this traffic load data.

In another variation of the first aspect, the communication synchronization device is further operative to obtain communication priority data concerning at least one of the applications and base the determination of the downlink coordination group also on this communication priority data.

In a corresponding variation of the second aspect, the method further comprises obtaining communication priority data concerning at least one of the applications and the determining of the downlink coordination group is based also on this communication priority data.

In a further variation of the first aspect, the communication synchronization device is further operative to obtain user priority data concerning communication priorities of a user of the wireless terminal in the wireless communication network and base the determination of the downlink coordination group also on this user priority data.

In a corresponding variation of the second aspect, the method further comprises obtaining user priority data concerning communication priorities of a user of the wireless terminal in the wireless communication network and the determining of the downlink coordination group is based also on this user priority data.

The communications of the communication sessions may comprise requests for transmissions sent from the applications to the server devices.

In yet another variation of the first aspect, the communication synchronization device is further operative to investigate these requests for transmissions when investigating communication patterns.

In a corresponding variation of the second aspect, the investigating communication patterns comprises investigating the requests for transmissions The server device transmissions may further comprise processing results of the server devices sent as responses to the request for transmissions In yet a further variation of the first aspect, the communication synchronization device is further operative to obtain indications of requests for transmission being user triggered and base the determination of downlink coordination group also on these indications of user triggered requests.

In a corresponding variation of the second aspect, the method further comprises obtaining indications of requests for transmission being user triggered and the determining of the downlink coordination group is based also on these indications of user triggered requests.

In still another variation of the first aspect, the communication synchronization device is further operative to also obtain a battery energy level indication concerning the wireless terminal and base the determination of downlink coordination group also on this battery energy level indication.

The determination of coordination groups may be performed using machine learning technique while the server device transmissions of the aggregated transmission may be sent in a common container.

In still a further variation of the first aspect, the communication synchronization device is further operative to synchronise the frequency of the transmissions made by the server devices in the communication sessions of the downlink coordination group.

In a corresponding variation of the second aspect, the method further comprises synchronising the frequency of transmissions made by the server devices in the communication sessions of the downlink coordination group.

In another variation of the first aspect, the communication synchronization device is further operative to.

study the communication patterns of communications between several wireless terminals in communication sessions between an application provided in all the wireless terminals and a server device corresponding to the application, determine a server communication coordination group comprising at least some of the communication sessions based on the studied communication patterns, collect communications made by the wireless terminals in the server communication coordination group, and send the collected wireless terminal communications to the server device as an aggregated transmission so that the individual communications may be handled jointly by the server device.

In a corresponding variation of the second aspect, the method further comprises studying the communication patterns of communications between several wireless terminals in communication sessions between an application provided in all the wireless terminals and a server device corresponding to the application, determining a server communication coordination group comprising at least some of the communication sessions based on the studied communication patterns, collecting (108) communications made by the wireless terminals in the server communication coordination group, and sending (110) the collected wireless terminal communications to the server device as an aggregated transmission so that the individual communications may be handled jointly by the server device.

Another object of the invention is to enable a reduction of the resources used by a wireless terminal in a wireless communication network communicating with more than one server device to be made.

This object is according to a fifth aspect achieved through a wireless device for handling communication between client applications in a wireless terminal and corresponding server devices providing data for the applications. The wireless device comprises a processor acting on computer instructions, through which the wireless device is operative to receive an aggregated transmission from a communication synchronization device via a common wireless link. The aggregated transmission comprises transmissions made by server devices involved in communication sessions with applications running in the wireless terminal, where the server device transmissions are aligned with each other in time and are also transmissions in communication sessions being sessions in a downlink coordination group having been formed based on an investigation of communications in communication sessions between a number of server devices and applications running in the wireless terminal. The wireless device is further operative to distribute data of the received transmissions to the applications.

This object is according to a sixth aspect achieved through a method for handling communication between client applications in a wireless terminal and corresponding server devices providing data for the applications. The method is performed in a wireless device and comprises receiving an aggregated transmission from a communication synchronization device via a common wireless link. The aggregated transmission comprises transmissions made by server devices involved in communication sessions with applications running in the wireless terminal, where the server device transmissions are aligned with each other in time and are also transmissions in communication sessions being sessions in a downlink coordination group having been formed based on an investigation of communications in communication sessions between a number of server devices and applications running in the wireless terminal. The method further comprises distributing data of the received transmissions to the applications.

The object is according to a seventh aspect achieved through a computer program for handling communication between client applications in a wireless terminal and corresponding server devices providing data for the applications. The computer program comprises computer program code which when run in a wireless device, causes the wireless device to receive an aggregated transmission from a communication synchronization device via a common wireless link. The aggregated transmission comprises transmissions made by server devices involved in communication sessions with applications running in the wireless terminal, where the server device transmissions are aligned with each other in time and are also transmissions in communication sessions being sessions in a downlink coordination group having been formed based on an investigation of communications in communication sessions between a number of server devices and applications running in the wireless terminal. The code further causes the wireless device to distribute data of the received transmissions to the applications.

The object is according to an eighth aspect achieved through a computer program product for handling communication between client applications in a wireless terminal and corresponding server devices providing data for the application, said computer program product being provided on a data carrier and comprising said computer program code according to the eighth aspect.

According to one variation of the fifth aspect, the wireless device is further operative to detect user selections made in relation to an application, detect an ensuing communication from the wireless terminal to the corresponding server device, which ensuing communication comprises a request for transmission, generate an indication of a request for transmission being user triggered based on the detections and transmitting the indication to the communication synchronization device for use in the forming of coordination groups.

According to a corresponding variation of the sixth aspect, the method further comprises detecting user selections made in relation to an application, detecting an ensuing communication from the wireless terminal to the corresponding server device, which ensuing communication comprises a request for transmission, generating an indication of a request for transmission being user triggered based on the detections and transmitting the indication to the communication synchronization device for use in the forming of coordination groups.

According to another variation of the fifth aspect, the wireless device is further operative to detect an energy level of a battery in the wireless terminal, generate a battery energy level indication based on the detected energy level concerning the wireless terminal and transmit the battery energy level indication to the communication synchronization device for use in the forming of coordination groups.

According to a corresponding variation of the sixth aspect, the method further comprises detecting an energy level of a battery in the wireless terminal, generating a battery energy level indication based on the detected energy level concerning the wireless terminal and transmitting the battery energy level indication to the communication synchronization device for use in the forming of coordination groups.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

As mentioned earlier, the spreading of client applications, often denoted

Apps, into wireless terminals has exploded in recent years. The wireless terminal may in this case be a mobile phone, such as a smart phone, a tablet computer or any other computing device able to communicate wirelessly. The client applications furthermore communicate with server devices in order to receive content. In order for these applications to able actually request and receive such content separate communication sessions are beings set up between the applications in the wireless terminals and the corresponding server devices via the wireless communication network. There may therefore be several parallel communication sessions involving a single wireless terminal.

In such sessions the amount of data being transmitted may often be low. However, a separate communication channel is still often kept open between the wireless terminal and the wireless communication network for every session. The communication resources, assigned to a wireless terminal may thereby be considerable and these resources may be scarcely used, which is a form of waste.

This may be problematic for the network operator in that scarcely used resources are being tied up to a wireless terminal, which resources could instead be assigned to other wireless terminals. This may be a problem when the demand for resources is higher than the availability.

However, this may also be troublesome for the wireless terminal. The keeping of these resources requires the use of radio circuitry. This means that radio circuitry is used for keeping a wireless channel open despite there being little or no data being sent or received. This may become a problem for the wireless terminals, since these are typically battery powered.

There is therefore a need for improving on this situation.

The present invention is directed towards improving on one or more of these issues.

One solution to the problem is the provision of a communication synchronisation device.

Figure 1:
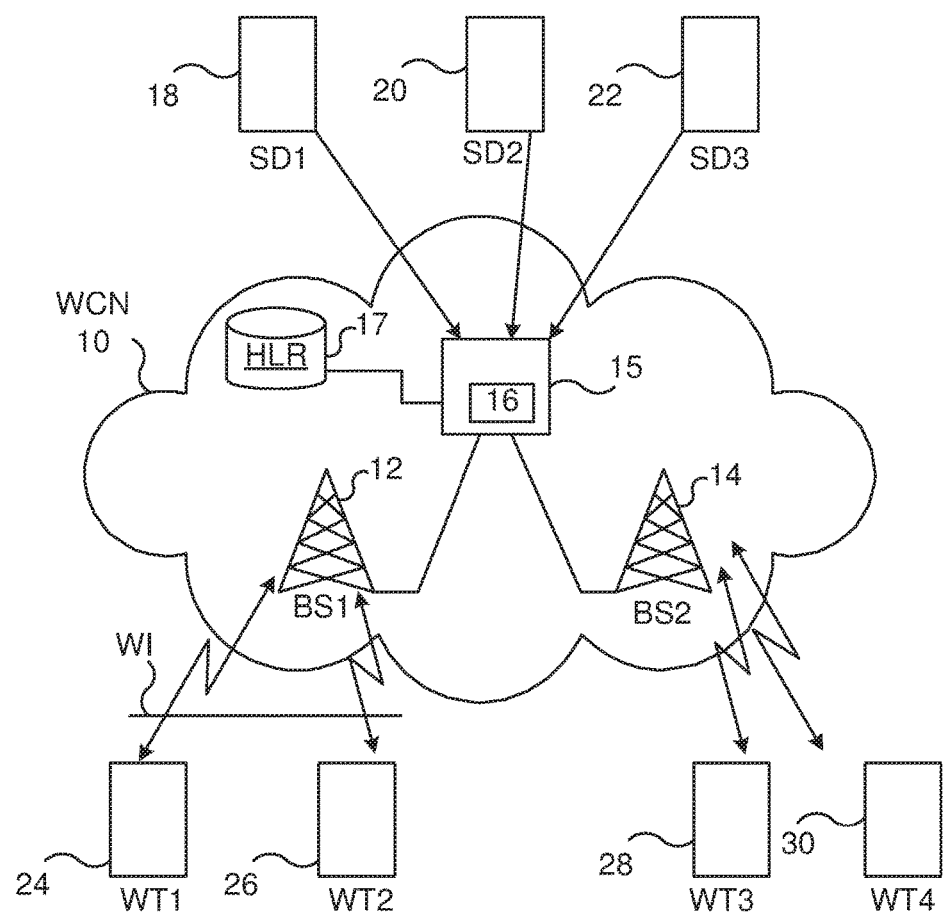
FIG. 1 schematically shows a wireless terminal where a number of wireless terminals communicate with server devices via a communication synchronisation device, FIG. 2 schematically shows a first realization of the communication synchronisation device.

One network, in the form of a wireless communication network WCN 10 is shown in FIG. 1. The exemplifying network is shown as comprising two base stations 12 and 14, in some systems denoted eNodeB, and a further network node 15. The further network node in this case comprises the above-mentioned communication synchronisation device CSD 16. The communicating synchronisation device 16 may be implemented in a node such as a Gateway GPRS support node (GGSN) or a Serving GPRS support node (SGSN), where GPRS is an acronym for General Packet Radio Service. The node 15 is also connected to Home Location Register HLR 17.

The device 16 may thus be a part of a wireless communication network, such as a mobile communication network, like Long Term Evolution (LTE) or Wideband Code Division Multiple Access (WCDMA). A mobile communication network may furthermore comprise a radio access network and a core network, where the core network may provide core network functionality such as keeping track of mobile terminals and their locations. The GGSN and SGSN nodes are core network nodes, while the base stations 12 and 14 are access network nodes. The communication synchronisation device 16 may as an example also be provided in other types of networks, such as in a Wireless Local Area Network (WLAN).

A number of wireless terminals 24, 26, 28 and 30 are also shown as communicating with the base stations 12 and 14. There is therefore a first and a second wireless terminal WT1 24 and WT2 26 wirelessly communicating with the first base station 12 as well as a third and a fourth wireless terminal WT3 28 and WT4 30 wirelessly communicating with the second base station 14. The first and second wireless terminals 24 and 26 furthermore communicate with the first base station 12 via a wireless interface WI of this first base station 12. The wireless terminals comprise applications that communicate with servers providing content or data for the applications. The applications are thus client applications communicating with server devices. For this reason the node 15 is disclosed as being connected to a first, second and third server device SD1 18, SD2 20 and SD3 22.

It should here be realized that the wireless communication network 10 has been simplified and may comprise many more nodes between the wireless terminals and the server devices. However, these have been omitted in order to provide a clearer and more cohesive understanding of the invention.

Figure 2:
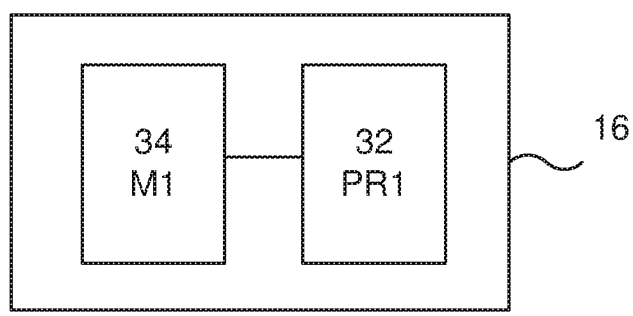

One variation of the communication synchronisation device 16 is shown in FIG. 2. According to this variation, the communication synchronisation device 16 is provided in the form of one or more processors with associated program memories comprising computer program code with computer program instructions executable by the processor for performing the functionality of the communication synchronisation device 16. In FIG. 2 one first such processor PR1 32 with a first memory M1 34 is shown.

Figure 3:
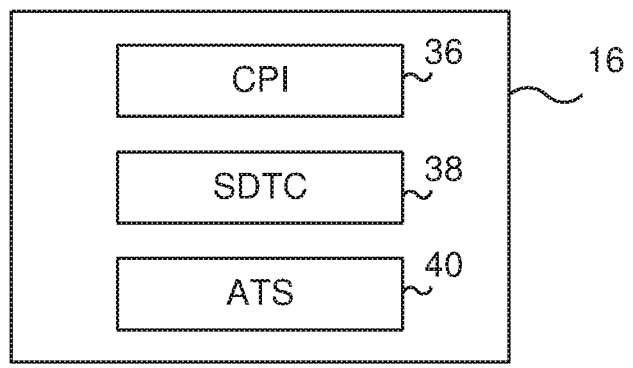
FIG. 3 shows a block schematic of a second realization of the communication synchronisation device being divided into a communication pattern investigator, a server device transmission collector and an aggregated transmission sender.

The functionality provided by the communication synchronisation device 16 is depicted in more detail in FIG. 3. The communication synchronisation device in this variation comprises three different units. It comprises a communication pattern investigator CPI 36, a server device transmission collector SDTC 38 and an aggregated transmission sender ATS 40.

Figure 4:
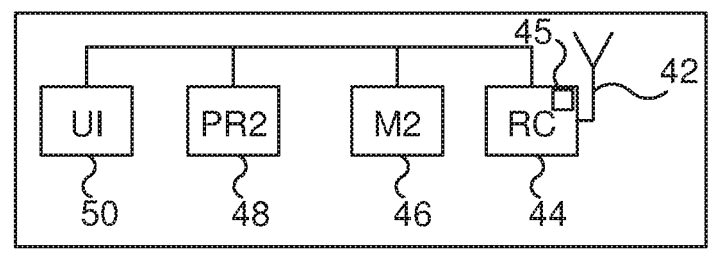
FIG. 4 shows a block schematic of a realization of a first wireless terminal, FIG. 5 schematically shows requests and processing responses sent between the first wireless terminal and the server devices via the wireless network, FIG. 6 schematically shows a flow chart of a method for synchronizing communication between client applications running in the first wireless terminal and the server devices according to a first embodiment and being performed by the communication synchronisation device.

FIG. 4 shows an exemplifying block schematic of the first wireless terminal 24. The terminal 24 comprises a communication bus 52 and to this bus there is connected a radio circuit 44, a second memory M2 46, a second processor PR2 48 and a user interface UI50. The user interface 50 may for instance comprise a touch screen display. It may alternatively comprise a regular display and keypad. The radio circuit 44 is connected to an antenna 42 and also comprises a communication coordinating unit 45. This communication coordinating unit 45 is one way in which a wireless device may be implemented in the wireless terminal. The second processor 48 and second memory 46 here together provide various functions of the wireless terminal including the above-described applications. As an alternative the wireless device may also be implemented through the combination of second processor 48 and memory 46.

Figure 5:
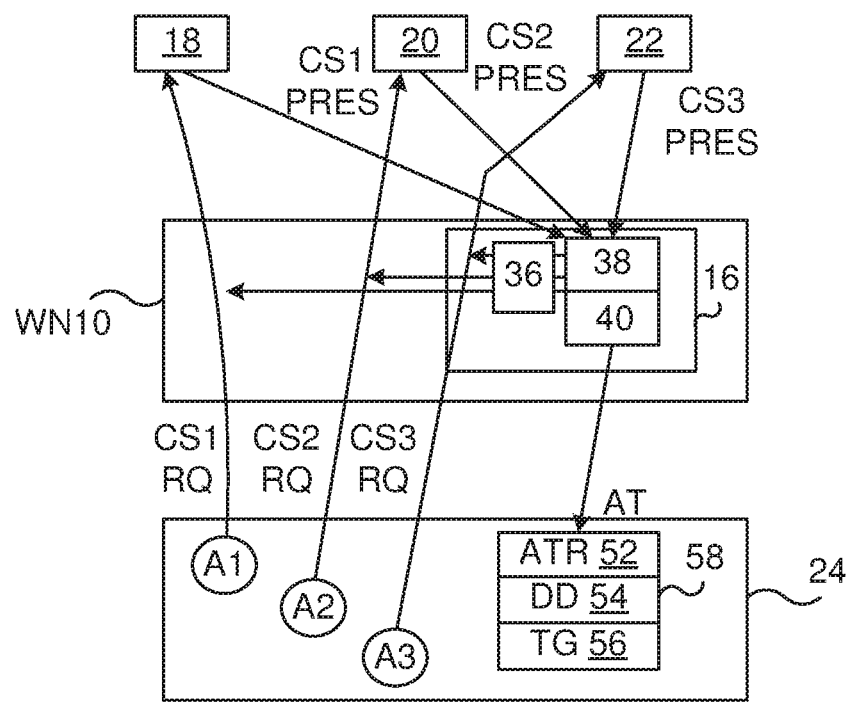

FIG. 5 schematically outlines the data communication between the first wireless terminal 24 and the server devices 18, 20 and 22 via the wireless network 10. It more particularly shows requests and processing responses sent between the first wireless terminal 24 and the network 10, where the responses pass via the communication synchronisation device 16. The first wireless terminal 24 comprises three such exemplifying client applications A1, A2 and A3. Each of these applications or client programs furthermore communicates with a corresponding server. For this reason the first application A1 communicates with the first server 18 the second application A2 communicates with the second server 20 and the third application A3 communicates with the third server 22. Each application is thereby involved in a communication session with a corresponding server via the wireless communication network 10 and in such a communication session, the applications send requests for transmissions RQ and receive processing response PRES from the corresponding servers. As can be seen in FIG. 5, there is thus a first communication session CS1 in which the first application A1 sends a request RQ to the first server 18, which responds with processing results PRES. There is also a second communication session CS2 in which the second application A2 sends a request RQ to the second server 20, which responds with processing result PRES. There is finally a third communication session CS3 in which the third application A3 sends a request RQ to the third server 22, which responds with processing result PRES. The requests RQ pass through network 10 and are shown as being monitored by the communication pattern investigator 36 of the communication synchronisation device 16. The responses with processing results PRES are however sent from the servers to the server device transmission collector 38 of the communication synchronisation device 16, the aggregated transmission sender 40 of which in turn sends an aggregated transmission AT to the wireless terminal 24.

The first wireless terminal 24 is in turn shown comprising the above-mentioned wireless device 58 comprising an aggregated transmission receiver ATR 52 that receives the aggregated transmission AT, a data distributor DD 54 that distributes responses to the applications as well as an indication generator IG 56.

Figure 6:
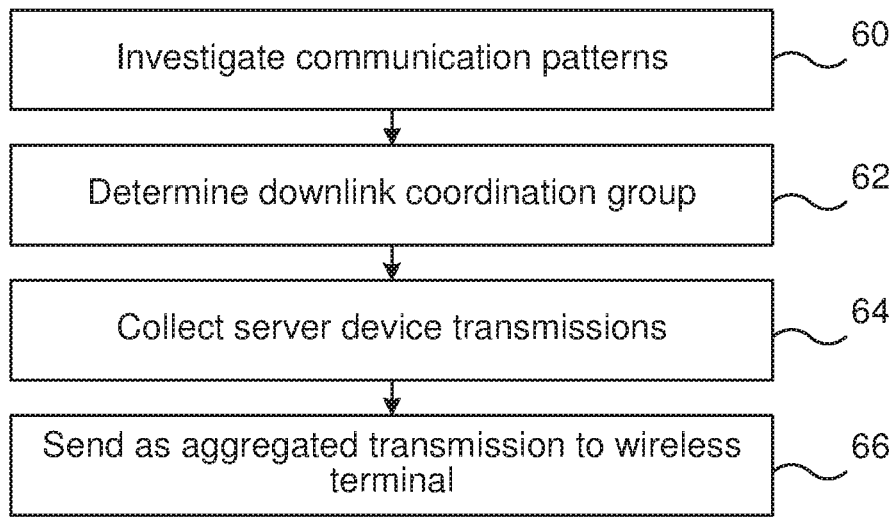
Figure 7:
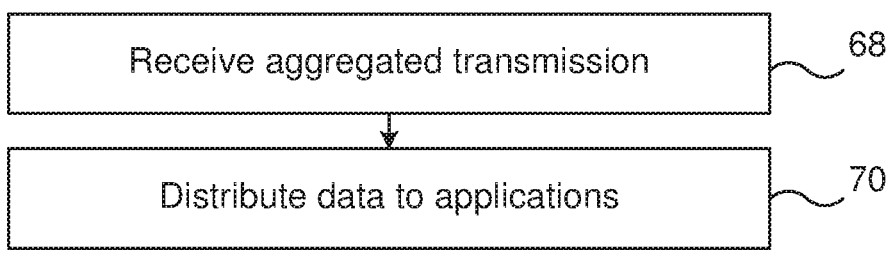
FIG. 7 shows a flow chart of a method for handling communication between client applications in the first wireless terminal and the server devices according to the first embodiment and being performed in the first wireless terminal, FIG. 8 schematically shows a flow chart of a method for synchronizing communication between client applications running in the first wireless terminal and the server devices according to a second embodiment and being performed by the communication synchronisation device.

A first embodiment will now be described with reference being made also to FIGS. 6 and 7, where FIG. 6 schematically shows a flow chart of a method for synchronizing communication between client applications running in the first wireless terminal and corresponding server devices and being performed by the communication synchronisation device and FIG. 7 shows a flow chart of a method for handling communication between client applications in the first wireless terminal and corresponding server devices being performed by the wireless communication devoice in the first wireless terminal.

A user of the wireless terminal may download client applications, often termed apps, which applications may then be stored in a local memory, such as the second memory 46 of the first wireless terminal 24 and then run by the second processor 48. The applications may also need to communicate with corresponding server devices in order to provide a service to the user. These applications are thus used by the user of the wireless terminal 24 for communicating with server devices providing data for the applications such as various types of content. Applications may be such diverse things as social network applications, news delivery applications and stock market rate applications. They may also be games. In this first embodiment there are three such exemplifying applications A1, A2 and A3. Each of these applications or client programs A1, A2 and A3 furthermore communicate with a corresponding server. For this reason the first application A1 communicates with the first server 18, the second application A2 communicates with the second server 20 and the third application A3 communicates with the third server 22. Each application is thereby involved in a communication session with a corresponding server via the wireless communication network 10 and in such a communication session, the applications send requests for transmissions RQ and receives processing results PRES from the servers as responses to these requests. The communication sessions are thus ongoing between the applications and server devices via the wireless network 10. As can be seen in the example of FIG. 5, the first application A1 sends a request RQ to the first server 18, which responds with processing results PRES in the first communication session CS1. In the second communication session CS2 the second application A2 sends a request RQ to the second server 20, which responds with processing result PRES. In the third communication session CS3 the third application A3 sends a request RQ to the third server 22, which responds with processing result PRES. As the communications are performed via the wireless communication network 10, the applications all use the radio circuit 44 and antenna 42 for the communication sessions. Furthermore, each session is traditionally using a separate radio link of the wireless interface WI, i.e. a separate data channel. This means that the first application A1 may use a first wireless uplink communication channel and a first wireless downlink communication channel, to the first base station 12, the second application A2 may use a second wireless uplink communication channel and a second wireless downlink communication channel to the first base station 12 and the third application A3 may use a third wireless uplink communication channel and a third wireless downlink communication channel to the first base station 12.

Data on these channels may then be sent both periodically automatically by the applications as well as more randomly triggered by user activations. The first application A1 may for instance be set to automatically generate a request RQ at a certain first period or frequency f1, the second application A2 may be set to generate a request at second period or frequency f2 and the third application A3 may be set to automatically generate a request at a third period or frequency. These periods or frequencies may be the same or differ from each other. In addition to these automatically generate requests, a user may also trigger the generation of a request by an application through using it via the user interface 50. Such a user triggered request may be sent in addition to the automatic request generated with the periodicity or frequency of the application. The user triggered requests for an application may also have a pattern, which is an individual pattern of the user.

The generation of requests between the different applications is not coordinated, so that the probability of coincidence is fairly low. There is thus no coordination between the applications in the sending of requests and also no coordination of the responses. This also means that radio links are unnecessarily occupied for the communication sessions and kept active even though no new data may be about to be received and/or sent.

The applications thus send requests RQ and these pass through the wireless communication network 10, The communication pattern investigator 36 of the communication synchronisation device 16 in this network 10 is in this embodiment set to monitor these requests. It may then monitor the requests RQ as they pass via a network node, such as a GGSN node or SGSN node, which is easily done if the communication synchronisation device 16 is implemented in one such node. As an alternative the communication synchronisation device 16 may monitor requests as these pass through a base station. The communication synchronisation device may also monitor the responses to the request that are returned from the server devices. The communication pattern investigator 36 then investigates the communication patterns of these communications RQ, PRES between the first wireless terminal 24 and server devices 18, 20, 22 in the communication sessions CS1, CS2, CS3 between the applications A1, A2, A3 running in the wireless terminal and the server devices 18, 20, 22, step 60.

The investigating may in this case specifically involve investigating the requests RQ sent by the applications, for instance with regard to automatic request generation periodicity and perhaps also user triggered request pattern. The investigation may also comprise the investigation of historical data about user triggered requests in the applications. The automatic request generation periodicities and user triggered request generation patterns may be obtained through machine learning techniques. The machine learning techniques may more particularly be used in order to analyse the communication sessions to and from the server devices (seen from the wireless network perspective), with the aim to identify possible ways for making this traffic as optimized as possible for the wireless network to handle, while at the same time ensuring that the user experience of the affected services on the wireless terminal device do not suffer. The automatic request generation periodicity may also be standardised and/or information about it provided by the party providing the application. For this reason, the communication pattern investigator may communicate with the server devices or some other entities of the provider of the application and receive knowledge of the automatic request generation periodicities or frequencies.

Based on the investigation, the communication pattern investigator 36 then determines a downlink coordination group comprising at least some of the communication sessions, step 62. In the forming of such groups the communication pattern investigator 36 may investigate other circumstances. It may for instance investigate if the communications of the user of the first wireless terminal 24 are prioritised over the communications of other users. The user may for instance have a subscription to the wireless network 10 where a certain service level with regard to data traffic, such as data traffic of the applications, is guaranteed. The user may for instance have a subscription where delays in responses to request are not allowed to be outside of an allowable time interval. The communication pattern investigator may for this reason optionally connect to the HLR 17 and obtain user priority data concerning communication priorities of the user of the first wireless terminal and base the determination of the downlink coordination group also on this user priority data. The communication pattern investigator 36 may optionally also obtain communication priority data concerning at least one of the applications and base the determining of the downlink coordination group also on this communication priority data. The applications may for instance require a certain periodicity or frequency of requests and responses as well as a delay limit and the communication priority data may also be considered when forming a downlink coordination group. The provider of the application may notify the network of the required periodicities or frequencies of the applications and the network may store communication priority data about these periodicities in a database. The communication pattern investigator 38 may then look in this database for obtaining the communication priority data. Alternatively it may directly contact the server devices or other entities of the providers of the applications in order to obtain such communication priority data.

It is also possible to consider the traffic load in the wireless network 10, such as the load of the base station with which the wireless terminal is in contact, which in the present example is the first base station 12.

The communication priority group being formed will then be a group that aggregates the transmissions of the communication sessions while considering constraints given by the studied communication patterns. It may also consider constraints such as user priority settings, communication priority data and traffic load. It is possible to set, for each application, a maximum allowed period of the communications in the communication sessions of this application. The transmissions of the communication sessions that are possible to synchronise with each other while keeping the periodicity within the maximum allowed period may be combined into a communication priority group. The group thus comprises communication sessions for which the individual communications between the server devices and the applications can be coordinated. They may more particularly be aligned with each other in time. In the examples given in FIG. 5 all three communication sessions may be possible to form into a group.

After having formed the group, the communication pattern investigator 36 informs the server device transmission collector 38, which in turn collects transmissions PRES made by the server devices 18, 20, 22 in the communication sessions CS1, CS2, CS3 of the downlink coordination group, step 64. The responses with processing results PRES sent from the server device and intended for the first wireless terminal are thus collected by the server device transmission collector 38 in order to be transmitted collectively to the first wireless terminal. The collecting may involve buffering responses until it is time to transmit. However, it is also possible that a request is buffered and then forwarded to a server device with a timing set for the response to received in time for the collective transmission. It is also possible that a request is being sent by server device transmission collector 38 to a server device before a corresponding request is received from the corresponding application in the wireless terminal. It is thus possible that responses with processing results PRES are delivered ahead of the time according to the periodicity or frequencies of the application. As there are different frequencies in the communications, these frequencies have to be aligned with each other, which in the present case means that some transmissions may keep their timing, others delayed and some triggered to be received prematurely in order to make the transmissions from the server devices be aligned with each other time, i.e. transmitted at the same time, over the wireless interface WI. The ability to buffer communications and send further requests also enables the server device transmission collector 38 to freely adjust the frequency of the responses. It can thus be seen that it is possible to change the request period. It is thus possible to lower as well as raise the frequency by which responses with processing results PRES are received. Thereby the server device transmission collector 38 may be further able to synchronise the frequency of the transmissions made by the server devices in the communication sessions of the downlink coordination group. The response from the server devices involved in the communication sessions of the downlink communication group, may then be buffered in a transmit buffer, which buffer may be a part of the aggregated transmission sender 40. The buffering may involve buffering at least some server device transmissions until an aggregated transmission is due.

The transmissions made by the server devices, i.e. the collected responses with processing results PRES, which may be present in the previously mentioned transmit buffer, may then be sent to the first wireless terminal 24 as an aggregated transmission AT via a common wireless link, step 66. The transmission times of the processing results of the communication sessions in the downlink coordination group may thus be aligned with each other. The alignment of the transmission times may furthermore be the alignment of the transmission times at the wireless interface WI. The collected transmissions may thus be sent in a common wireless downlink data channel provided between the first base station 12 and the first wireless terminal 24. The may here be consecutively transmitted or transmitted serially.

The aggregated transmission are then received by the aggregated transmission receiver 52 of the first wireless terminal 24, step 68, and then forwarded to the data distributor 54, which then distributes the responses to the various applications, step 70. It can thereby be seen that the indication generator 56 may be omitted from the wireless device 58. It may in this regard actually be possible to omit the functionality of the wireless device 58 altogether from the wireless terminal 24 of this first embodiment. It is possible that the regular radio circuit functionality is able to receive and distribute the responses to the applications.

It can in this way be seen that the number of channels used for receiving transmissions may be limited, which limits the wireless resource waste in the downlink. This may also save battery power in the wireless terminal.

Put differently, it can be seen that the communication synchronisation device may be considered to form a application/system/framework residing in the wireless network, for instance located in a mobile network node such as GGSN, and being responsible for identifying the data requests coming from the client applications and for identifying (for instance using machine learning techniques) patterns or other parameters that it uses to govern how the independent data signals of the communication sessions shall be treated (such as defining delays, thresholds for delays, principles for caching, and so on).

The communication synchronisation device furthermore makes the wireless network traffic between an individual wireless terminal and the Internet (through the wireless network) more efficient by analyzing ongoing data traffic between applications/services on the wireless terminal and their internet based counterparts, i.e. the server devices, in order to coordinate and even group the individual data streams (if certain critical conditions are met).

The communication synchronisation device was above exemplified as a wireless network node. It could as an alternative be a wireless network cloud component.

The functionality may furthermore be described in the following way:

As an application, such as A1, on the first wireless terminal 24 begins requesting and receiving data RQ and PRES, the communication synchronisation device starts to keep track of this with the ambition to determine if the data traffic between the application and its internet counterpart, i.e. the first server device 18, is just a single request or if there is a more continuous form of communication (either manual—as in a person who manually clicks on links or updates information, or automatic—as in an application that periodically requests new information automatically in accordance with a predefined time interval). This process may utilize various kinds of data mining and analysis methods. If the traffic is classified as periodic, the wireless network continues to "monitor" it, while perhaps also associating it with an obfuscated device ID.

As soon as another application on the first wireless terminal 24 starts to communicate with a corresponding Internet service/application/process the communication synchronisation device 16 pursues the same procedure as was used for the first application A1.

When the communication synchronisation device 16 has classified two or more active "sessions" as periodic, it may begin to further monitor the data streams coming from the wireless terminal and going to the respective Internet based counterparts, i.e. to the corresponding server devices. The goal for the communication synchronisation device 16 may now be to create knowledge about the individual data communication frequency, response times for their Internet service counterparts, the amount of data that is being transmitted between the applications on the wireless terminals and the server devices, and more. The communication synchronisation device 16 may also look at saved historic information about update frequencies associated with the applications/processes in question, as well as other information such as information associated to the user (such as usage patterns and preferences—for example manual update requests), associated information (of the same kind as for the specific user in question) about other users in the wireless network that have used the same applications, and more. It may also consult the HLR 17 in order to find out if there are any restrictions for the user of the first wireless terminal with regard to the use of applications. The communication synchronisation device 16 may then collect/group the data communication that is transmitted between the first wireless terminal 24 and the wireless network 10, containing the data traffic generated by the applications/processes on the wireless terminal 24 and their corresponding processes/applications/services on the Internet.

Based on the above-mentioned investigations the communication synchronisation device 16 may then set out to identify and describe an optimal data aggregation and communication model with the ambition to make the wireless network data traffic more efficient. This model may take several (sometimes conflicting) considerations into account.

It may for instance consider the affected applications/processes. Each application/process has a "desired" update profile (the update time interval, the data being transmitted between the application in the device and the Internet based counterpart, and more) that has to be considered. For these applications/processes the update frequency is most likely essential to the perceived experience of how well they work, something that has to be carefully considered. It is worth pointing out that the model that the communication synchronisation device eventually presents might increase the update frequency for some of the affected applications/processes, and decrease it for others.

It can thus be seen that incoming data traffic (from the Internet to the wireless terminal) is to synchronized in order to replace the many asynchronous low data rate connections with aggregated transmissions that contain more data (since they contain several of the smaller data signals) but that are transmitted less often, and in a more synchronized way, which thus reduced the load on the wireless interface between the first wireless terminal and the wireless network as well as the energy consumption of the first wireless terminal.

Figure 8:
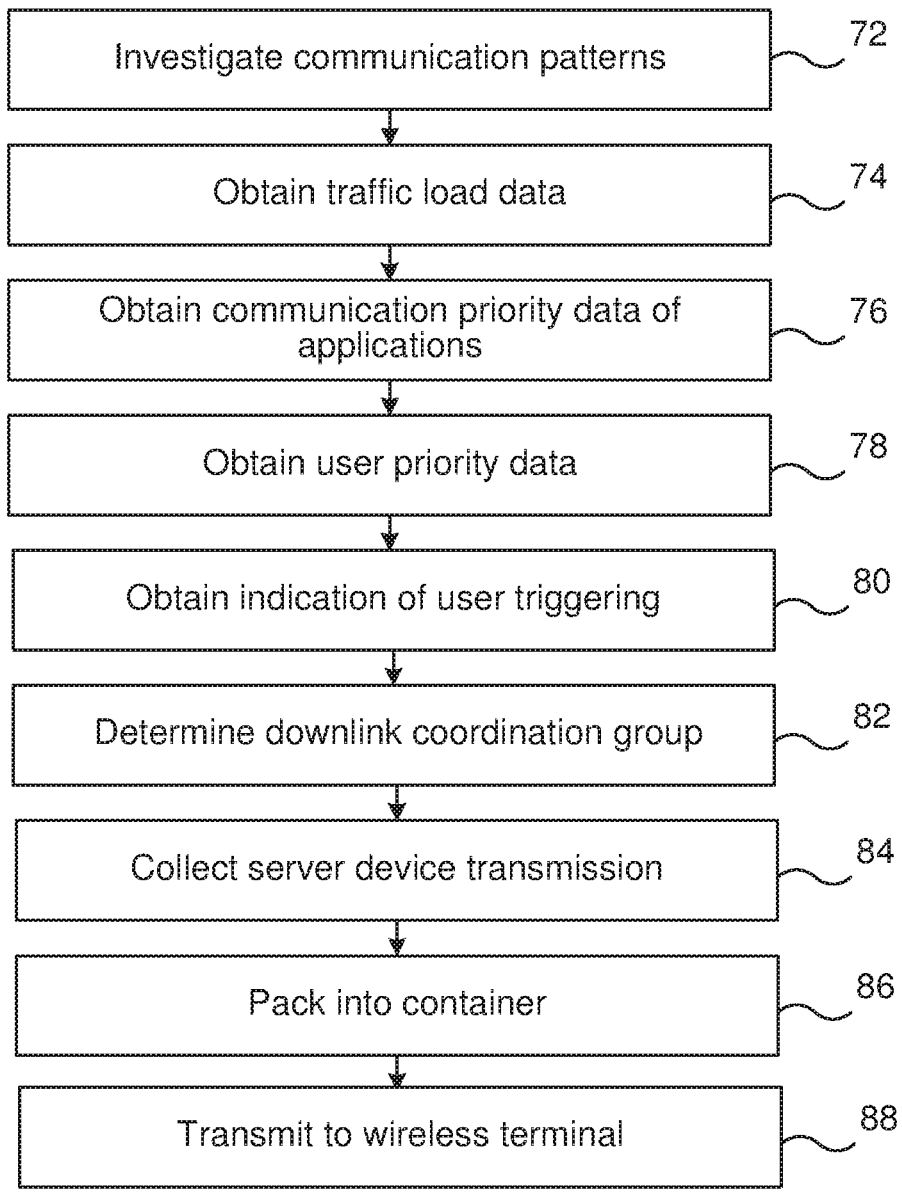
Figure 9:
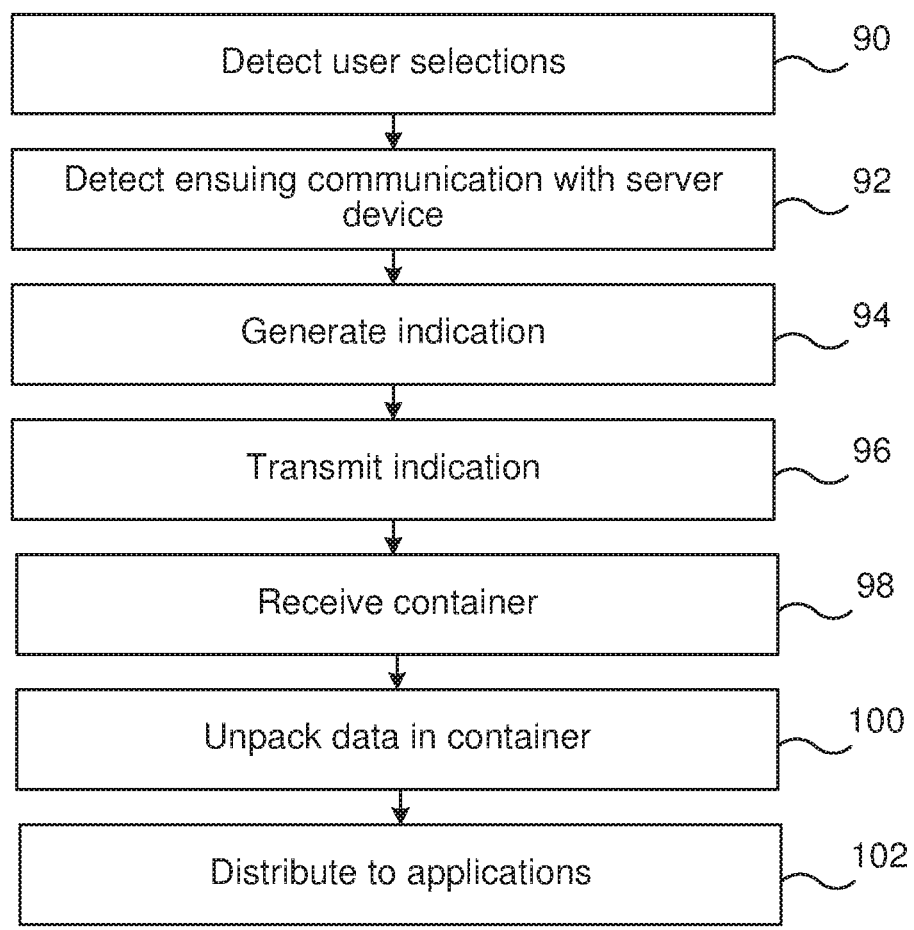
FIG. 9 shows a flow chart of a method for handling communication between client applications in the first wireless terminal and the server devices according to a second embodiment and being performed in the first wireless terminal.

Now a second embodiment will be described with reference being made also to FIG. 8, which schematically shows a flow chart of a method for synchronizing communication between client applications running in the first wireless terminal and the server devices and being performed by the communication synchronisation device, as well as to FIG. 9, which shows a flow chart of a method for handling communication between client applications in the first wireless terminal and the server devices and being performed in the first wireless terminal.

In this case the wireless terminal comprises the wireless device 58 comprising the indication generator 56. Furthermore, there are, just as in the first embodiment the three exemplifying applications A1, A2, A3 being active in the first wireless terminal 24, and the communications in the sessions CS1, CS2 and CS3 may yet again be monitored by the communication pattern investigator 36 of the communication synchronisation device 16. Alternatively the wireless device 58 may comprise a unit that reports the communications of the sessions, i.e. both requests RQ and responses PRES, to the communication pattern investigator 36. The wireless device 58 of the wireless terminal 24 furthermore uses the indication generator 56 to monitor the user selections. It may for instance monitor if any user inputs are made via the user interface 50. It may thus detect user selections being made in the first wireless terminal 24, step 90. It may also detect requests RQ being sent by the applications. If an application sends a request to a corresponding server device after the detection of a user activity, then the indication generator 58 may assume that the user selection was made in the application and that the ensuing request RQ is a user triggered request. If after having detected a user selection, the indication generator 56 then detects ensuing communication between an application and a server device, step 92, the indication generator 56 may determine that the user selection was made in the application and that therefore the request being sent in ensuing communication is a user triggered request. It may thus generate an indication that the request is user triggered based on these detections, step 94, It may here also be possible that the automatic request generation of applications is known by the indication generator, in which case it is also possible to better discern between automatic requests and the user triggered requests. It is alternatively possible that the request generator 56 comes to the conclusion that a request is an automatic periodic request if not being accompanied by any user selections. It is here possible that the indication generator also provides indications of automatically generated requests, in which case it is not necessary for the communication pattern investigator to monitor requests sent by the wireless terminal. In this case it will receive all the necessary pattern information from the indication generator. It is furthermore possible that the indicator generator determines the automatic request periodicities and user selection patterns for the applications. The indication generator 56 may also keep history data about user triggered requests in the applications and provide a report of such history data.

The indication generator 56 may furthermore generate a battery energy level indication concerning the wireless terminal. This may be done through obtaining data of the energy level of the battery of the wireless terminal, for instance through interrogating a battery level determining function implemented through the second memory 46 and second processor 48.

After having generated different indications as well as possible request periodicities and historic data reports, these are then transmitted by the indication generator 56 to the wireless network 10 using the radio circuit 44 and antenna 42, step 96. All this data is then received by the base station 12 and forwarded to the communication pattern investigator 36 of the communication synchronisation device 16.

If not receiving any user selection pattern data or automatic request generation periodicity data, then the communication pattern investigator may monitor the communications of the communication sessions and thereafter investigate the communication patterns, step 72.

The investigating may also here involve investigating the automatic request generation periodicity as well as user trigger pattern. The investigation may furthermore involve investigating historic user triggered request data, for instance in an obtained historic data report or historic data it itself has.

In this embodiment the communication pattern investigator 36 also obtains circumstantial or environmental data for the communication sessions. It thus obtains traffic load data concerning the traffic load in the wireless network, step 74. The traffic load data may concern the traffic load of a wireless interface provided by the first base station 12 for communicating with wireless terminals. It may for instance report the amount of resources being occupied by different wireless terminals, if there is congestion etc. The communication pattern investigator 36 may likewise obtain communication priority data of the applications, step 76. It may thus obtain data about for instance maximum allowed delays for the specific applications. The communication priority data may be obtained in the same way as described above in relation to the first embodiment. The communication pattern investigator 36 may also obtain user priority data, step 78. This data may also be obtained in the same way as in the first embodiment, such as through obtaining possible user settings in the HLR 17. It does of course also obtain the indication of user triggering, i.e. the indication of requests being user triggered, from the indicator generator 56, step 80.

After having studied the various patterns of all the applications as well as the circumstances or the environment of the communication sessions, which environment is made up of the above-mentioned circumstantial data, the communication pattern investigator then determines at least one downlink coordination group, step 82. The determination is based on the communication patterns. It is also here possible to apply restrictions caused by the subscription of the user and requirements set by the application provider. This means that a communication session is included in the downlink coordination group if the change of timing of transmissions over the wireless interface WI is within the limitations set out by a corresponding restriction. Also the battery indication may be considered. If the battery indication indicates that the battery level is high, such as above an energy threshold indicating a high energy level such as above 75% then a more strict determination of maximum allowed delays in the forming of the downlink coordination group, while if the level is below a low level threshold, such as below 25%, then a more relaxed determination of maximum allowed delays may be used. In the latter case it may for instance be allowable to contravene application requirements and even user priorities. This means that if the battery level is high the number of communication sessions in the downlink coordination group may be low, while if the battery level is low several more communication sessions may be included on the downlink coordination group.

The same type of reasoning is applicable concerning the load. If the load on the first base station 12 is low then a more strict determination of maximum allowed delays in the forming of the downlink coordination group is applied, while if the level is high then a more relaxed determination of maximum allowed delays may be used. This means that if the traffic load is low, the number of communication sessions in the downlink coordination group may be low, while if the traffic load is high several more communication sessions may be included in the downlink coordination group.

The communication pattern investigator may also determine a periodicity or frequency of the aggregated transmissions, i.e. the time interval between consecutive aggregated transmissions. The period may be chosen as a weighted average of periods of the applications, where the more time sensitive applications are given a higher weight.

The server device transmissions of communication sessions that are being determined to be in a group are then collected by the server device transmission collector 38 for being transmitted in an aggregated transmission AT, step 84, which collection may be performed in the same ways as was described in the first embodiment. Responses with processing results PRES may thus be delayed as well as caused to be received prematurely. The responses may in this case also be placed in a buffer.

When it is time to transmit the responses with processing results PRES, the aggregated transmission sender 40 may then empty the buffer and pack the 30 content in a common container, step 86.

The responses set for being transmitted in the container may furthermore be encrypted and/or compressed and then the container is transmitted as an aggregated transmission AT to the first wireless terminal 24 in a common downlink communication channel, step 88. This means that all the responses are sent in the same downlink communication channel.

The container is then received in the first wireless terminal 24 by the radio circuit 44 via the antenna 42 and forwarded to the aggregated transmission receiver 52 of the wireless device 58, and in this way the aggregated transmission receiver receives the container, step 98.

In the aggregated transmission receiver 52, the data in the container is unpacked, step 100, which may involve decryption and/or decompression of the data. The data is then forwarded to the data distributor, 54, which investigates the responses with regard to which application they are intended for. The data distributor 54 then distributes that data to the different applications, step 102.

It can in this way be seen that the downlink traffic is condensed and that therefore resources are used more economically, which is of advantage to the wireless network and often also the wireless terminal.

There are a number of variations that are possible to make of the teachings described herein. It is for instance possible to also send the requests as an aggregated transmission. The wireless device 58 may comprise an application transmission collector which may be instructed by the communication pattern investigator 36 to delay or buffer requests emitted by the applications of the downlink coordination group for being sent in an aggregated transmission from the wireless terminal to the communication synchronisation device, which could then comprise an aggregated transmission receiver that receives aggregated transmission. The aggregated transmission receiver of the communication synchronisation device may then distribute the requests to the different server devices. The wireless device provided in the wireless terminal, such as in the communication coordinating unit 45 of the radio circuit 44, may thus be informed by the communication synchronization device 16 about the created groups, collect the requests emitted by the applications involved in communication sessions of the group, pack these into a container and transmit the container to the aggregated transmission receiver of the communication synchronisation device, which in turn unpacks the container and distributes the requests to the various server devices.

Another possible variation can be understood from studying FIG. 1. It is possible that the several wireless terminals use the same application. It is for instance possible that the first, second, third and fourth wireless terminals 24, 26, 28 and 30 all have the first application A1 running and communicating with the first server device 18. It is in this case possible that the communication synchronisation device 16 also provides an aggregated transmission for this application A1.

Figure 10:
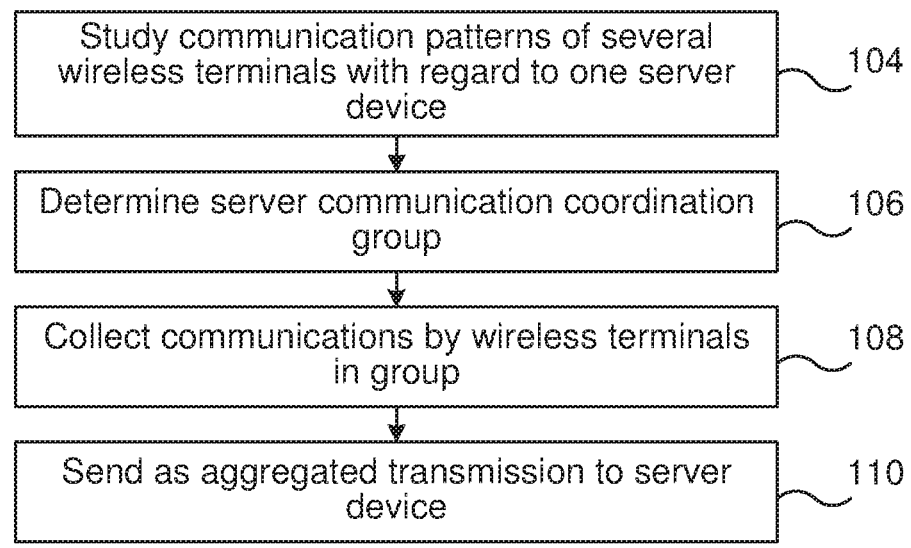
FIG. 10 shows a number of further method steps that may be performed by the communication synchronisation device in order to condense communication to a server device.

How this may be done will now also be described with reference being made to FIG. 10, which shows a number of further method steps that may be performed by the communication synchronisation device 16 in order to condense communication to a server device. The communication pattern investigator 36 in this case studies the requests from all the wireless terminals directed to the first server device 18 and optionally also the responses to these requests from the first server device. The investigations may be performed through monitoring communications and/or through the wireless terminals reporting to the communication pattern investigator 36. The communication pattern investigator 36 then studies the communication patterns of this plurality of wireless terminals 24, 26, 28 and 30 with regard to this one server device 18, step 104. It may also consider historic user triggered request data. It then determines a server communication coordination group, step 106, which may be done in basically the same way as the downlink coordination group was determined. The load of the base stations and the battery levels are with advantage left out from this determination. However, it is possible to consider the load on such things as an interface between the wireless network and the Internet instead. The communication pattern investigator 36 thereby investigates if it is possible to provide some or all of the requests RQ of these communication sessions in an aggregated transmission to the first server device 18. The communications made by the wireless terminals in the server communications coordination group may then be collected by the application transmission collector, step 108, and transmitted jointly to the server device as an aggregated transmission by another aggregated transmission sender dedicated to aggregated transmissions to server devices, step 110. Depending on the application this aggregated transmission may involve transmitting a request as a single request that is common to all mobile terminals or combining several requests in one transmission.

In a similar manner it is possible that all responses with processing results PRES are received from the first server device as an aggregated response transmission, which may, depending on the nature of the applications, also be the same response that is sent to all wireless terminals. The communication synchronisation device 16 then distributes the responses to the different wireless terminals so that they can be received by the first application A1. Naturally the response for one wireless terminal may also be combined with responses to other applications in an aggregated transmission.

It can be seen that in this latter variation the outgoing data traffic from the wireless network 10 to the multiple apps/processes Internet counterparts is synchronized, which relieves the burden on the interface between the wireless network and the Internet.

The communication synchronisation device 16 as well as the wireless device may, as was mentioned initially, be provided in the form one or more processors with associated program memories comprising compute program code with computer program instructions executable by the processor for performing the functionality of the traffic distribution layer.

Figure 11:
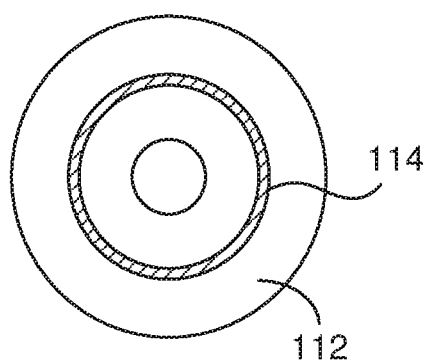
FIG. 11 shows a computer program product comprising a data carrier with computer program code for implementing the functionality of the communication synchronisation device and/or the data handling activity of the first wireless terminal.

The computer program code of a communication synchronisation device or a wireless device may also be in the form of computer program for instance on a data carrier, such as a CD ROM disc or a memory stick. In this case the data carrier carries a computer program with the computer program code, which will implement the functionality of the above-described communication synchronisation device or wireless device. One such data carrier 112 with computer program code 114 is schematically shown in FIG. 11.

Furthermore the communication pattern investigator of the communication synchronization device may be considered comprise means for investigating the communication patterns of communications between the wireless terminal and server devices in communication sessions between applications running in the wireless terminal and the server devices as well as means for determining a downlink coordination group comprising at least some of the communication sessions based on the investigation. The communication pattern investigator may also be consider to comprise means for obtaining traffic load data concerning the traffic load in the wireless communication network and basing the determination of the downlink coordination group also on this traffic load data. The communication pattern investigator may further be considered to comprise means for obtaining communication priority data concerning at least one of the applications and basing the determination of the downlink coordination group also on this communication priority data. The communication pattern investigator may also be considered to comprise means for obtaining user priority data concerning communication priorities of a user of the wireless terminal in the wireless communication network and basing the determination of the downlink coordination group also on this user priority data. The means for investigating communication patterns may further comprise means for investigating requests for transmissions. The communication pattern investigator may further be considered to comprise means for obtaining indications of requests for transmission being user triggered and basing the determination of downlink coordination group also on these indications of user triggered requests. The communication pattern investigator may further be considered to comprise means for obtaining a battery energy level indication concerning the wireless terminal and basing the determination of downlink coordination group also on this battery energy level indication. The communication pattern investigator may further be considered to comprise means for synchronising the frequency of the transmissions made by the server devices in the communication sessions of the downlink coordination group.

The server device transmission collector may be considered to comprise means for collecting transmissions made by the server devices in the communication sessions of the downlink coordination group through aligning the collected server device transmissions with each other in time.

The aggregated transmission sender may be considered to comprise means for sending the collected server device transmissions to the wireless terminal as an aggregated transmission via a common wireless link for handling by the wireless terminal.

The communication synchronization device may further be considered to comprise means for studying the communication patterns of communications between several wireless terminals in communication sessions between an application provided in all the wireless terminals and a server device corresponding to the application, means for determining a server communication coordination group comprising at least some of the communication sessions based on the studied communication patterns, means for collecting communications made by the wireless terminals in the server communication coordination group, and means for sending the collected wireless terminal communications to the server device as an aggregated transmission so that the individual communications may be handled jointly by the server device.

The aggregated transmission receiver of the wireless device may be considered to comprise mean for receiving, via a common wireless link and from a communication synchronization device, an aggregated transmission comprising transmissions made by server devices involved in communication sessions with applications running in the wireless terminal, where the server device transmissions are aligned with each other in time and being transmissions in communication sessions being sessions in a downlink coordination group having been formed based on an investigation of communications in communication sessions between a number of server devices and applications running in the wireless terminal.

The data distributor may in turn be considered to comprise means for distributing data of the received transmissions to the applications.

The indicator generator may in turn be considered to comprise means for detecting user selections made in relation to an application, means for detecting an ensuing communication from the wireless terminal to the corresponding server device, which ensuing communication comprises a request for transmission, means for generating an indication of a request for transmission being user triggered based on the detections and means for transmitting the indication to the communication synchronization device for use in the forming of coordination groups. The indicator generator may further be considered to comprise means for detecting an energy level of a battery in the wireless terminal, means for generating a battery energy level indication based on the detected energy level concerning the wireless terminal and means for transmitting the battery energy level indication to the communication synchronization device for use in the forming of coordination groups.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A communication synchronization device for synchronizing communication between client applications running in a wireless terminal and corresponding server devices providing data for the applications, the communication synchronization device being provided in a wireless communication network and comprising:
   a processor and memory, said memory containing computer instructions executable by said processor whereby said communication synchronization device is configured to:
      investigate the communication patterns of communications between the wireless terminal and server devices in communication sessions between applications running in the wireless terminal and said server devices,
      determine a downlink coordination group comprising at least some of the communication sessions, based on the investigation,
      collect transmissions made by the server devices in the communication sessions of the downlink coordination group, through aligning the collected server device transmissions with each other in time, and
      send the collected server device transmissions to the wireless terminal as an aggregated transmission via a common wireless link, for handling by the wireless terminal; and
   wherein, via execution by the processor of further computer instructions stored in the memory, the communication synchronization device is further configured to:
      study the communication patterns of communications between several wireless terminals in communication sessions between an application provided in all the wireless terminals and a server device corresponding to the application;
      determine a server communication coordination group comprising at least some of the communication sessions based on the studied communication patterns;
      collect communications made by the wireless terminals in the server communication coordination group; and
      send the collected wireless terminal communications to the server device as an aggregated transmission, so that the individual communications may be handled jointly by the server device.

2. The communication synchronization device according to claim 1, being further configured to obtain traffic load data concerning the traffic load in the wireless communication network and base the determination of the downlink coordination group further on the traffic load data.

3. The communication synchronization device according to claim 1, being further configured to obtain communication priority data concerning at least one of the applications and base the determination of the downlink coordination group further on the communication priority data.

4. The communication synchronization device according to claim 1, being further configured to obtain user priority data concerning communication priorities of a user of the wireless terminal in the wireless communication network and base the determination of the downlink coordination group further on the user priority data.

5. The communication synchronization device according to claim 1, wherein the communications of the communication sessions comprise requests for transmissions sent from the applications to the server devices, the communication synchronization device being further configured to investigate the requests for transmissions when investigating communication patterns.

6. The communication synchronization device according to claim 5, wherein the server device transmissions comprise processing results of the server devices sent as responses to the request for transmissions.

7. The communication synchronization device according to claim 5, being further configured to obtain indications of requests for transmission being user triggered, and base the determination of the downlink coordination group further on the indications of user triggered requests.

8. The communication synchronization device according to claim 1, being further configured to obtain a battery energy level indication concerning the wireless terminal, and base the determination of the downlink coordination group further on the battery energy level indication.

9. The communication synchronization device according to claim 1, wherein the determination of coordination groups is performed using a machine learning technique.

10. The communication synchronization device according to claim 1, being further configured to synchronize the frequency of the transmissions made by the server devices in the communication sessions of the downlink coordination group.

11. The communication synchronization device according to claim 1, wherein the server device transmissions of the aggregated transmission are sent in a common container.

12. A method for synchronizing communication between client applications running in a wireless terminal and corresponding server devices providing data for the applications, the method being performed in a communication synchronization device being provided in a wireless communication network and comprising:
   investigating the communication patterns of communications between the wireless terminal and server devices in communication sessions between applications running in the wireless terminal and said server devices;
   determining a downlink coordination group comprising at least some of the communication sessions, based on the investigation;
   collecting transmissions made by the server devices in the communication sessions of the downlink coordination group, through aligning the collected server device transmissions with each other in time; and
   sending the collected server device transmissions to the wireless terminal as an aggregated transmission via a common wireless link; and
   wherein the method further comprises studying the communication patterns of communications between several wireless terminals in communication sessions between an application provided in all the wireless terminals and a server device corresponding to the application, determining a server communication coordination group comprising at least some of the communication sessions based on the studied communication patterns, collecting communications made by the wireless terminals in the server communication coordination group, and sending the collected wireless terminal communications to the server device as an aggregated transmission, so that the individual communications may be handled jointly by the server device.

13. The method according to claim 12, further comprising obtaining traffic load data concerning the traffic load in the wireless communication network, and determining the downlink coordination group further based on the traffic load data.

14. The method according to claim 12, further comprising obtaining communication priority data concerning at least one of the applications, and determining the downlink coordination group further based on the communication priority data.

15. The method according to claim 12, further comprising obtaining user priority data concerning communication priorities of a user of the wireless terminal in the wireless communication network, and determining the downlink coordination group further based on the user priority data.

16. The method according to claim 12, wherein the communications of the communication sessions comprise requests for transmissions sent from the applications to the server devices, and wherein investigating the communication patterns comprises investigating said requests for transmissions.

17. The method according to claim 16, further comprising obtaining indications of requests for transmission being user triggered, and determining the downlink coordination group is further based on the indications of user triggered requests.

18. The method according to claim 12, further comprising synchronizing the frequency of transmissions made by the server devices in the communication sessions of the downlink coordination group.

19. A wireless terminal configured to handle communication between client applications in the wireless terminal and corresponding server devices providing data for the applications, the wireless terminal comprising a processor executing computer instructions whereby the wireless terminal is configured to:
receive, via a common wireless link and from a communication synchronization device, an aggregated transmission comprising transmissions made by server devices involved in communication sessions with applications running in the wireless terminal, said server device transmissions being aligned with each other in time and being transmissions in communication sessions being sessions in a downlink coordination group having been formed based on an investigation of communications in communication sessions between a number of server devices and applications running in the wireless terminal; and
wherein the transmissions made by the server devices comprise respective data packed into a common container that is received as the aggregated transmission, wherein the respective data for each one of the transmissions is packed into the common container via compression or encryption, and wherein, based on the execution of the computer instructions by the processor, the wireless terminal is configured to: unpack the respective data for each of the transmissions aggregated in the common container, and distribute the unpacked respective data to the applications.

20. The wireless terminal according to claim 19, being further configured to detect user selections made in relation to an application, detect an ensuing communication from the wireless terminal to the corresponding server device, which ensuing communication comprises a request for transmission, generate an indication of a request for transmission being user triggered based on the detections and transmitting the indication to the communication synchronization device for use in the forming of coordination groups.

21. The wireless terminal device according to claim 19, being further configured to detect an energy level of a battery in the wireless terminal, generate a battery energy level indication based on the detected energy level concerning the wireless terminal and transmit the battery energy level indication to the communication synchronization device for use in the forming of coordination groups.

22. A method for handling communication between client applications in a wireless terminal and corresponding server devices providing data for the applications, the method being performed in the wireless terminal and comprising
receiving, via a common wireless link and from a communication synchronization device, an aggregated transmission comprising transmissions made by server devices involved in communication sessions with applications running in the wireless terminal, said server device transmissions being aligned with each other in time and being transmissions in communication sessions being sessions in a downlink coordination group having been formed based on an investigation of the communications in communication sessions between a number of server devices and applications running in the wireless terminal; and
wherein the transmissions made by the server devices comprise respective data packed into a common container that is received as the aggregated transmission, wherein the respective data for each one of the transmissions is packed into the common container via compression or encryption, and wherein the method further comprises unpacking the respective data for each of the transmissions aggregated in the common container, and distributing the unpacked respective data of the received transmissions to the applications.

23. The method according to claim 22, further comprising detecting user selections made in relation to an application, detecting an ensuing communication from the wireless terminal to the corresponding server device, which ensuing communication comprises a request for transmission, generating an indication of a request for transmission being user triggered based on the detections and transmitting the indication to the communication synchronization device for use in the forming of coordination groups.

24. The method according to claim 22, further comprising detecting an energy level of a battery in the wireless terminal, generating a battery energy level indication based on the detected energy level concerning the wireless terminal and transmitting the battery energy level indication to the communication synchronization device for use in the forming of coordination groups.

25. A communication synchronization device for synchronizing communication between client applications running in a wireless terminal and corresponding server devices providing data for the applications, the communication synchronization device being provided in a wireless communication network and comprising:
a processor and memory, said memory containing computer instructions executable by said processor whereby said communication synchronization device is configured to:
investigate the communication patterns of communications between the wireless terminal and server devices in communication sessions between applications running in the wireless terminal and said server devices, determine a downlink coordination group comprising at least some of the communication sessions, based on the investigation, collect transmissions made by the server devices in the communication sessions of the downlink coordination group, through aligning the collected server device transmissions with each other in time, and send the collected server device transmissions to the wireless terminal as an aggregated transmission via a common wireless link, for handling by the wireless terminal, wherein, via execution by the processor of further computer instructions stored in the memory, the communication synchronization device is further configured to pack, via compression or encryption, respective data comprising each of the collected server device transmissions into a common container, and send the common container as the aggregated transmission.

* * * * *